United States Patent [19]

Norsworthy

[11] Patent Number: 4,651,153
[45] Date of Patent: Mar. 17, 1987

[54] LOW COMPLEXITY DIGITAL PROCESSOR FOR MX SECURITY RADAR

[75] Inventor: Keith H. Norsworthy, Bellevue, Wash.

[73] Assignee: The Boeing Company, Seattle, Wash.

[21] Appl. No.: 879,493

[22] Filed: Jun. 24, 1986

Related U.S. Application Data

[63] Continuation of Ser. No. 480,722, Mar. 31, 1983, abandoned.

[51] Int. Cl.⁴ .......................... G01S 13/58; G01S 7/44
[52] U.S. Cl. .................................... 342/110; 342/115
[58] Field of Search ...................... 343/5 DP, 7 A, 7.7, 343/17.1 R, 55 A, 9 R

[56] References Cited

U.S. PATENT DOCUMENTS

| | | | |
|---|---|---|---|
| 3,617,719 | 11/1971 | Wong | 235/152 |
| 3,717,756 | 2/1973 | Stitt | 235/181 |
| 3,737,900 | 6/1973 | Vehrs, Jr. | 343/5 DP |
| 3,987,442 | 10/1976 | McLeod, Jr. | 343/5 DR X |
| 4,001,820 | 1/1977 | Rosenbaum et al. | 343/55 A |
| 4,031,364 | 6/1977 | Wilmot | 235/151 |
| 4,106,019 | 8/1978 | Alexander et al. | 343/9 R |

FOREIGN PATENT DOCUMENTS 7804784 10/1979 France .

Primary Examiner—Thomas H. Tarcza
Assistant Examiner—Mark Hellner
Attorney, Agent, or Firm—Finnegan, Henderson, Farabow, Garrett and Dunner

[57] ABSTRACT

The radar signal processor multiplies in real time samples from a radar system and coefficients representing desired frequency windows to be examined and integrates those products over a time period related to the particular frequency window in order to determine the amount of energy in the different frequency windows of the different range bins of the radar system.

10 Claims, 5 Drawing Figures

FIG. 3.

| TIME | RANGE $R_1$ | BIN $R_2$ | FREQUENCY WINDOW $f_1$ s | $f_1$ c | $f_2$ s | $f_2$ c | $f_3$ s | $f_3$ c | ACCUMULATOR STORED VALUE |
|---|---|---|---|---|---|---|---|---|---|
| 1  | X |   | X |   |   |   |   |   | $A_s$ |
| 2  | X |   |   | X |   |   |   |   | $A_c$ |
| 3  | X |   |   |   | X |   |   |   | $B_s$ |
| 4  | X |   |   |   |   | X |   |   | $B_c$ |
| 5  | X |   |   |   |   |   | X |   | $C_s$ |
| 6  | X |   |   |   |   |   |   | X | $C_c$ |
| 7  |   | X | X |   |   |   |   |   | $D_s$ |
| 8  |   | X |   | X |   |   |   |   | $D_c$ |
| 9  |   | X |   |   | X |   |   |   | $E_s$ |
| 10 |   | X |   |   |   | X |   |   | $E_c$ |
| 11 |   | X |   |   |   |   | X |   | $F_s$ |
| 12 |   | X |   |   |   |   |   | X | $F_c$ |

THE SAME CYCLE REPEATS EVERY 12 TIME PERIODS.

LOW COMPLEXITY DIGITAL PROCESSOR FOR MX SECURITY RADAR

This application is a continuation of application Ser. No. 480,722 filed Mar. 31, 1983, abandoned.

BACKGROUND OF THE INVENTION

This invention relates to the field of radar signal processors and, in particular, to digital radar signal processors.

Radar systems are often used in security systems to detect the presence of objects intruding into a protected area. The detection of such objects involves the determination of the object's position and velocity.

The position of an object is typically expressed as its distance from the detecting radar system. This distance, or range as it is often called, can be determined from the delay between the transmission of an electromagnetic signal and the receipt of the reflections of that signal off the object. In operation, the area to be scanned by the detecting radar system is divided into a number of range bins. The reflections received by the radar system are periodically sampled, each successive sample corresponding to a more distant range bin, to determine the presence of objects in each range bin.

The velocity of a detected object can be measured from the Doppler frequency shift between the transmitted and received signals. This frequency shift can be used to find the velocity of a detected object with respect to the detection radar system. The determination of the Doppler frequency shift involves the examination of the amount of energy in each of several frequency windows, the examination usually involving either analog or digital filters.

A common way to detect intruding objects using the information received from such a radar system is to gather sampled reflections into a large memory and then to process those samples to determine the velocities of any objects found in the examined range bins.

Such a conventional system is shown schematically in FIG. 1. After electromagnetic pulses are emitted by radar system 101, system 101 samples the reflections from the pulses and the samples are inputted to the memory 120 of processor 110. For a security system examining 50 range bins which requires 100 samples for each range bin, the memory must be capable of storing at least 5,000 sample values. Actually, a memory at least twice that size might be needed to store samples which are being received while the previous 5,000 samples are being processed.

Assuming that 20 different Doppler frequency windows are required to determine the objects' velocities with sufficient precision, then each of the 5,000 samples must pass through 20 Doppler frequency filters (either analog or digital). Thus, to process the 5,000 samples using the system in FIG. 1, 100,000 filter operations would need to take place after all the samples are gathered.

The chief disadvantages of such a system are its requirement of a large memory and the delay between the beginning of a search, which is characterized by the transmission of electromagnetic pulses, and the beginning of the processing of those samples to determine the presence and velocity of any intruding objects.

It is an object of the present invention to simplify the hardware and procedure for processing of radar signals.

It is a further object of the invention to reduce the amount of storage necessary for such radar signal processing.

Yet another object of the present invention is to speed up the radar signal processing to reduce the time between the beginning of a search and the determination of the outcome of a search.

SUMMARY OF THE INVENTION

Briefly, the radar signal processor of this invention mixes, in real time, samples received from the radar system with certain weighting function coefficients that correspond to the frequency windows to be examined. Each product of that mixing is added to a corresponding running sum or integral which, at appropriate times, is used to determine the amount of energy in the frequency windows examined for the different range bins.

More particularly, the radar signal processor of this invention for determining, from samples of energy received from a radar system, the amount of energy received in at least one range bin and in at least one frequency window comprises: a memory for storing a set of coefficients which relate to the number, bandwidth, and shape of the at least one frequency window; means connected to the memory and to the radar system for multiplying each of the samples by corresponding individual ones of the coefficients; an accumulator connected to the multiplying means for forming, from the products from the multiplying means, at least one integral, each integral corresponding to a different range bin and frequency window combination; and means connected to the accumulator for periodically computing from the integrals formed by the accumulator the amount of energy received by the radar system in at least one range bin and in at least one frequency window.

The method of this invention for determining, from samples of energy received by a radar system, the amount of energy in at least one frequency window of at least one range bin, each frequency window corresponding to two sets of coefficients which relate to the bandwidth and shape of that window, comprises the steps of: multiplying each of the samples by a corresponding coefficient from each of the sets; forming, from each product of a sample and a corresponding coefficient, at least one integral, each integral corresponding to the range bin of the sample and the frequency window related to the coefficient used to form that product; and periodically computing, using the at least one integral, the amount of energy received by the radar system in the at least one frequency window of the at least one range bin.

BRIEF DESCRIPTION OF THE DRAWINGS

FIG. 3 is a table showing the stored values in an accumulator that could be used in the radar signal processor of FIG. 2.

DESCRIPTION OF THE PREFERRED EMBODIMENT

Reference will now be made in detail to a presently preferred embodiment of the invention, an example of which is illustrated in the accompanying drawings.

Figure 1:
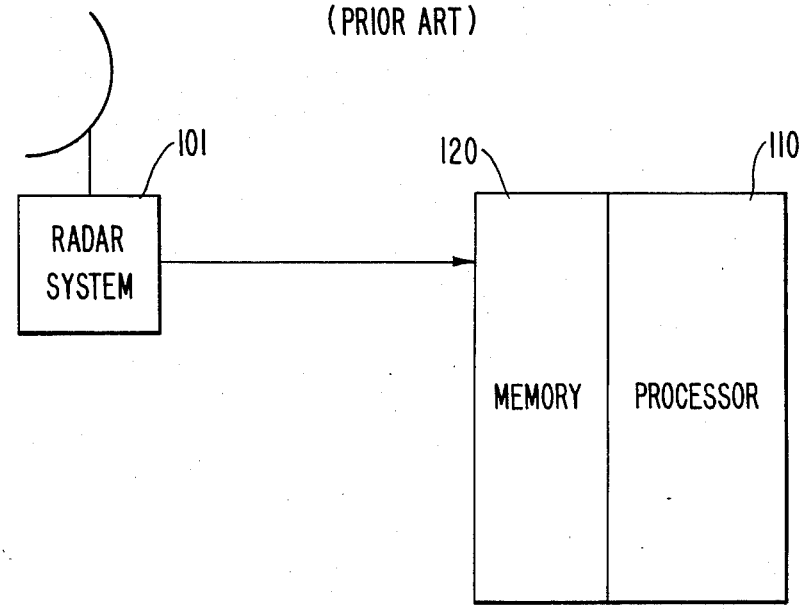
FIG. 1 is a schematic drawing of a prior art signal processor.
Figure 2:
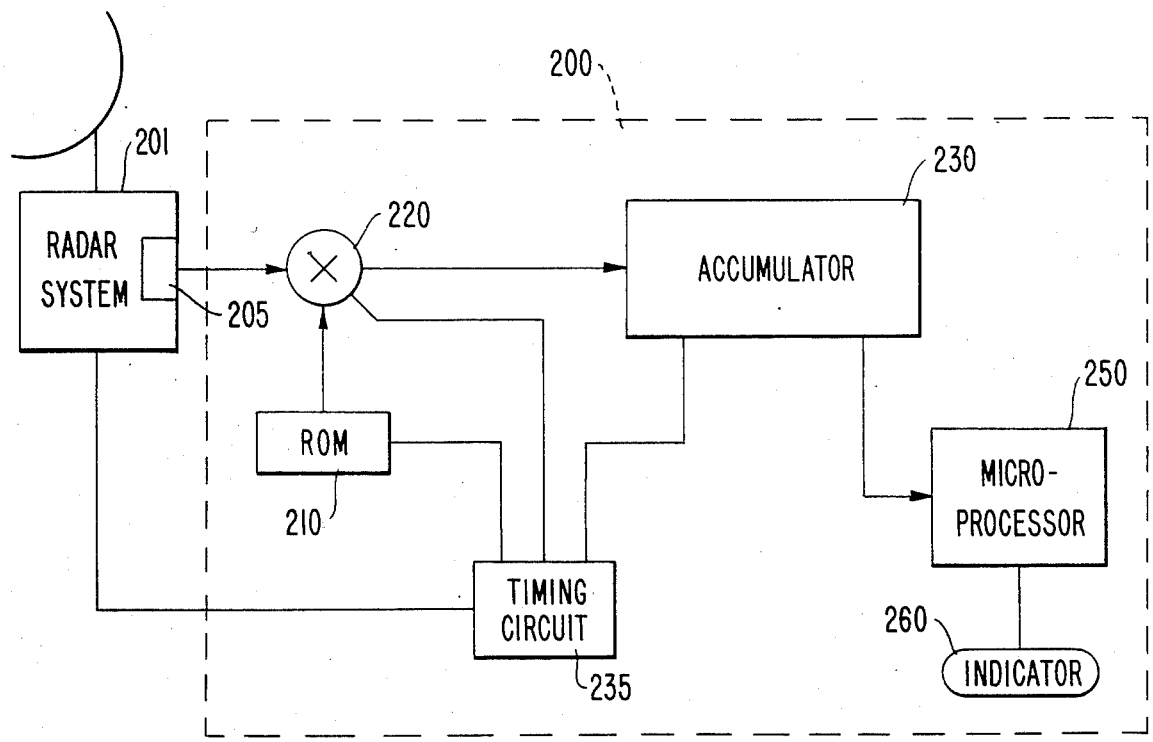
FIG. 2 is a block diagram showing an embodiment of a radar signal processor according to this invention.

FIG. 2 shows an embodiment of a low complexity radar signal processor 200 of this invention. A radar system 201, connected to radar signal processor 200, transmits pulses of electromagnetic energy into an area to be examined. System 201 then heterodynes the received signals with a signal at the frequency of the transmitted pulses to create a baseband signal representing the reflected energy.

At predetermined intervals after the transmission of a pulse, radar system 201 samples the baseband signal and produces digital values corresponding to the magnitude of the received energy of each sample. For a particular pulse, each sample corresponds responds to a different range bin; thus, a system with 50 range bins would produce 50 digitized samples of reflected energy for each transmitted pulse. The digitized samples are stored in a buffer 205 which is part of radar system 201. Buffer 205 helps ensure synchronization of radar system 201 and radar signal processor 200.

In the following of radar signal processor 200, two range bins are being investigated and the same three frequency windows are being examined for each range bin. It is to be understood that the radar signal processor of this invention is not limited to only two range bins or three frequency windows.

The explanation of radar signal processor 200 also assumes that radar system 201 outputs signals from only one channel. Again, this does not constitute a limitation to the radar signal processor of this invention. The modifications necessary to the structure and operation of the radar signal processor 200 for use with a radar system producing quadrature signals can be learned from U.S. patent application Ser. No. 307,163 filed on Sept. 30, 1981 by Keith H. Norsworthy which is incorporated by reference.

Radar signal processor 200 includes Read Only Memory (ROM) 210, shown in FIG. 2. ROM 210 stores, for each frequency window to be examined, a set of coefficients of weighting functions. Each set defines the bandwidth and shape of the corresponding frequency window. Such weighting functions are known by persons of ordinary skill and can include, for example, the well-known Hamming or Hanning weighting functions. For the radar signal processor in FIG. 2, the same three frequency windows are to be examined for each range bin, so ROM 210 contains three sets of coefficients.

Each set of coefficients in ROM 210 has two subsets of coefficients which define orthogonal components of each weighting function (or, alternatively, which define orthogonal weighting functions). These components are also referred to as the sine and cosine functions of the weighting function and are needed for the measurement of the amount of energy in the examined frequency windows.

If the frequency windows have certain relationships, for example, if the center frequencies and bandwidths of the windows are binary multiples of each other, it may be possible to use the same coefficients for more than one weighting function, thereby reducing the size of ROM 210.

The radar signal processor of this invention includes means connected to the memory and to the radar system for multiplying each of the samples by corresponding individual ones of the coefficients stored in the memory. In the embodiment of the invention shown in FIG. 2, the multiplying means includes digital multiplier 220.

Multiplier 220 multiplies each sample by certain of the coefficients stored in ROM 210. Specifically, each sample is multiplied by a pair of coefficients from each set corresponding to the frequency windows being examined. Each coefficient in the pair is from a different orthogonal subset of the corresponding weighting function. With regard to the radar signal processor in FIG. 2, each sample is multiplied by six different values, one from each of the two orthogonal subsets of the three frequency windows.

Preferably, each radar system sample is multiplied first by one coefficient of the first frequency window's weighting function, then by one coefficient from the orthogonal weighting function for the first frequency window, then by one coefficient of the second frequency window's weighting function, etc. If $R_{i1}$ and $R_{i2}$ represent the ith radar system samples for the first and second range bins, and $D_{i1}$, $D_{i1}'$, $D_{i2}$, $D_{i2}'$, and $D_{i3}$, $D_{i3}'$ represent the respective orthogonal pairs of coefficients for the three frequency windows for the ith sample, the preferred order of multiplication would be as follows:

$R_{i1} D_{i1}$
$R_{i1} D_{i1}'$
$R_{i1} D_{i2}$
$R_{i1} D_{i2}'$
$R_{i1} D_{i3}$
$R_{i1} D_{i3}'$
$R_{i2} D_{i1}$
$R_{i2} D_{i1}'$
$R_{i2} D_{i2}$
$R_{i2} D_{i2}'$
$R_{i2} D_{i3}$
$R_{i2} D_{i3}'$

In certain instances where there are numerous range bins and frequency windows or where the desired ranges are narrow and closely spaced, it may not be possible to form all the necessary products for one sample before the next sample is available. In such cases, buffer 205 in radar system 201 stores the samples from each radar transmitted pulse until they can be processed.

As can be seen, the multiplying means performs, in a broad sense, a filtering operation. Although multiplier 220 is shown as a digital multiplier, the multiplying means of the invention is not so limited and can include devices which mix radar samples with the frequency window weighting functions by other means, for example, by analog filtering.

The radar signal processor of this invention also includes an accumulator connected to the multiplying means for forming integrals each corresponding to a different range bin/frequency window combination. In FIG. 2, the accumulator 230 adds each product of a sample and a coefficient from multiplier 220 to the stored value corresponding to the range bin of the sample and the frequency window relating to the coefficient forming that product.

The accumulator in this invention is effectively integrating each of the range bin/frequency window products over certain time periods. The time period for each integral is inversely proportional to the bandwidth of the corresponding frequency window. With the example above, if the center frequency and bandwidth of the first frequency window are twice the center frequency and bandwidth of the second frequency window and four times the center frequency and bandwidth of the third frequency window, then the integration period for the integrals corresponding to the first frequency window would equal one-half the period of the integrals corresponding to the second frequency window and one-fourth the period of the integrals corresponding to the third frequency window.

Figure 4:
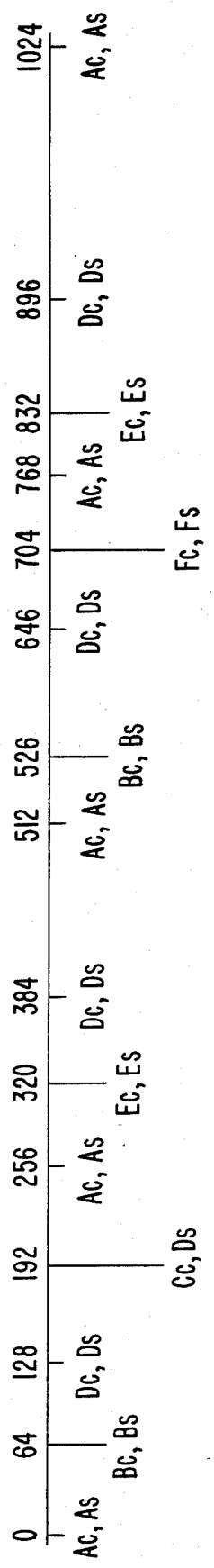
FIG. 4 is a timing diagram for outputting the values indicated in FIG. 3.

FIGS. 3 and 4 illustrate this feature in greater detail. If the radar signal processor in FIG. 2 is used for two range bins and three frequencies then accumulator 230 will have twelve different stored values corresponding to different combinations of the two range bins, three frequency windows for each range bin, and the two orthogonal weighting functions for each frequency window.

FIG. 3 shows the repeating sequences of forming the integrals. Each integral value is denoted by a letter A-F corresponding to a different range bin/frequency window combination and a subscript s or c indicating whether the integral is formed from coefficients from the sine or cosine weighting function. If the frequencies are binarily related as indicated above, then integrals $A_s$, $A_c$, $D_s$ and $D_c$ require half the samples for computation that values $B_s$, $B_c$, $E_s$ and $E_c$ require and one-fourth the samples that values $C_c$, $C_c$, $F_s$ and $F_c$ require. The following table shows specific numbers of samples for each integral (accumulator value).

| Range Bin | Frequency Window | Accumulator Value | Number of Samples Required For Integration |
|---|---|---|---|
| $R_1$ | $f_1$ | $A_s$, $A_c$ | 256 |
| $R_1$ | $f_2$ | $B_s$, $B_c$ | 512 |
| $R_1$ | $f_3$ | $C_s$, $C_c$ | 1024 |
| $R_2$ | $f_1$ | $D_s$, $D_c$ | 256 |
| $R_2$ | $f_2$ | $E_s$, $E_c$ | 512 |
| $R_2$ | $f_3$ | $F_s$, $F_c$ | 1024 |

The values from accumulator 230 can be outputted in a staggered manner, as indicated in FIG. 4, to facilitate subsequent processing.

Figure 5:
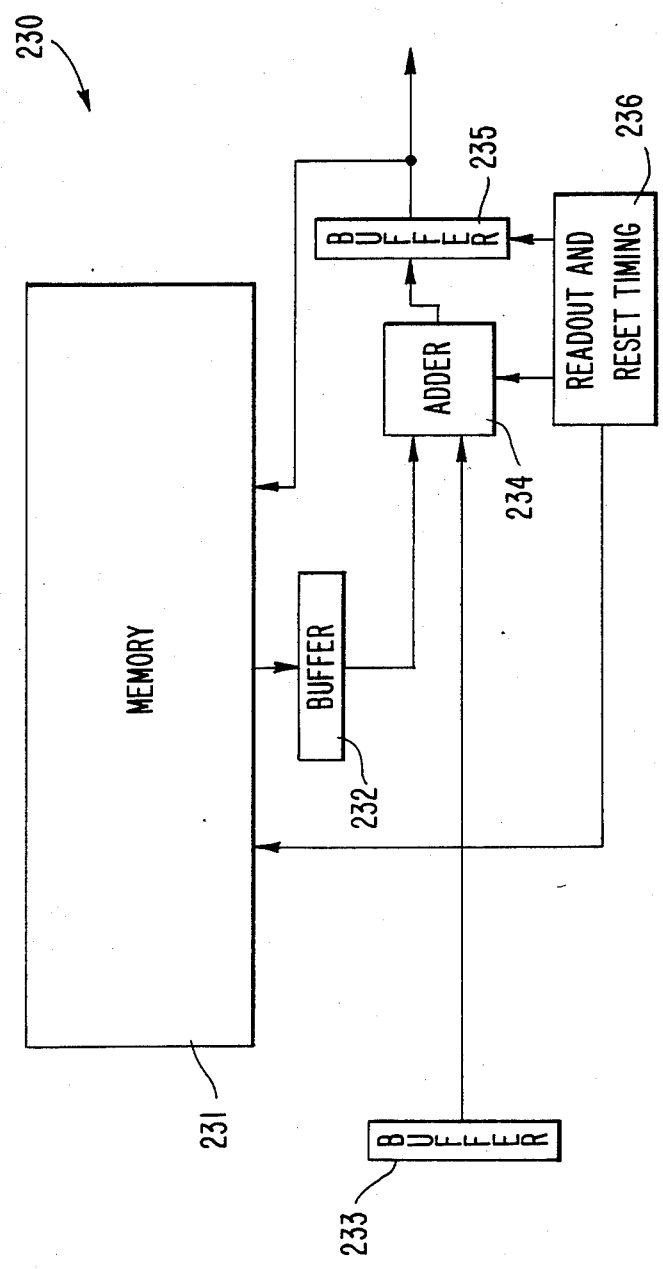
FIG. 5 is a block diagram of an accumulator which can be used in the radar signal processor shown in FIG. 2.

FIG. 5 shows an embodiment of accumulator 230. Digital memory 231 contains at least W locations, where W=2 (number of range bins) (number of frequency windows per range bins). W equals 12 for the radar signal processor in FIG. 2 having the characteristics described above.

When a product arrives from the multiplier 220, the product is stored in buffer 233 and the value of the corresponding location in memory 231 is stored in buffer 232. Digital adder 234 adds the values in buffers 232 and 233 and places their sum into buffer 235. That sum is either read back into memory 231 at the same location from which the word in buffer 232 was taken from, or the sum can be outputted. Readout and reset timing 236 controls the output of buffer 235 and the clearing of the memory locations at the end of their integration periods.

As can be seen by the descriptions above, the operation of radar system 201, ROM 210, multiplier 220 and accumulator 230 must be synchronized. The present invention includes timing means connected to the memory, the multiplying means and the accumulator for synchronizing the transmission of samples and coefficients to the multiplying means and the transmission of products from the multiplying means to the accumulator. In FIG. 2, timing circuit 235 provides the necessary synchronization by directing radar system 201 and ROM 210 when to present the signals to multiplier 220. Timing circuit 235 also informs accumulator 230 which products it is receiving from multiplier 220.

While timing circuit 235 is shown as a separate element in FIG. 2, it should be recognized that that circuit can be included in another of the circuit elements shown in FIG. 2.

In accordance with the present invention, the radar signal processor of this invention includes means connected to the accumulator for periodically computing the amount of energy received by the radar system in at least one range bin and at least one frequency window from the integrals formed by the accumulator. In the embodiment shown in FIG. 2, this means would include microprocessor 250 which computes the average power in each range bin and frequency window examined.

There are many different methods of computing average power from the values in the accumulator. One method involves the computations of average power for a selected range bin and frequency window, $P_G = (G_s^2 + G_c^2)^{\frac{1}{2}}$, where $G_s$ and $G_c$ are respectively the accumulated values of the sine and cosine weightings for a selected range bin and frequency window. G represents the different range bin/frequency window combinations A-F as described above. Successive power computations can also be inputted to a smoothing function which acts like a low pass filter to minimize the effect of transient phenomena. One such function is $$X_{G,n} = X_{G,n-1} + (P_{G,n-1} - X_{G,n-1})K_G$$

where $X_{G,0} = 0$, $K_G$ is a predetermined smoothing constant related to the frequency windows, and $P_{G,n-1}$ is the $(N-1)$th computation for average power in a selected range bin and frequency windows.

When $X_{G,n}$ exceeds some threshold, $T_G$, an indicator 260, for example an LED or an audio alarm, is activated by the microprocessor. Threshold $T_G$ would normally be inversely related to the integrating time of the accumulator (e.g., 256, 512 or 1024 units in the above example).

Once the purpose of the energy computing means is understood, the advantage of interleaving the outputs of the accumulator can be appreciated more fully. The accumulator integrals can be made available to the microprocessor in an order which allows the power calculations to be made soon after the associated accumulator integrals are complete. Accumulator 230 in FIG. 2 interrupts microprocessor 250 when each integral is ready for output. The microprocessor, either under program control or by direct memory access (DMA), accepts the integral values and computes the average power at its earliest opportunity.

The radar signal process in FIG. 2 was described above as being connected to a radar system outputting samples from one channel. If signals from quadrature channels signals are available from radar system 101, then the direction of an intruding object as well as its speed can be determined. One of ordinary skill could contruct the device of this invention with the teachings in U.S. patent application Ser. No. 307,163.

It will be apparent to those skilled in the art that modifications and variations can be made in the radar signal processing methods and apparatus of this invention. The invention in its broader sense is not limited to the specific details, representative methods, and apparatus illustrated above. Accordingly, departure may be made from such details without departing from the spirit or scope of the general inventive concept.

What is claimed is:

1. A radar signal processor for determining the amount of energy received in d (d being greater than 1) frequency windows of a radar system producing samples of received energy from r range bins, said radar signal processor comprising:

a memory storing d sets of coefficients, each set of coefficients corresponding to a different one of said frequency windows and each of said sets including two subsets of coefficients, the coefficients in each of said subsets representing a weighting function which is orthogonal to the weighting function represented by the other of said subsets;

single means time-shared connected to said memory and to said radar system for multiplying each of said samples by a coefficient of each of said subsets thereby to form 2d product sequences for each sample;

an accumulator connected to said multiplying means for storing 2dr summed values, each of said values corresponding to a different combination of range bin, frequency window and coefficient subset, said accumulator adding each of said product sequences to a summed value corresponding to the range bin of the sample and to the coefficient subset used to form that product sequence; and means connected to said accumulator for periodically computing the amount of energy received in each of said r range bins and each of said d frequency windows from selected values from said accumulator.

2. The radar signal processor according to claim 1 wherein said multiplying means includes a digital multiplying circuit and said computing means includes a microprocessor.

3. A method of determining, from samples of energy received by a radar system, the amount of energy in more than one frequency window of at least one range bin, each said frequency window corresponding to two subsets of coefficients which relate to the bandwidth and shape of said frequency window, said method comprising the steps of:

multiplying in a single multiplying element each of said samples by a corresponding coefficient from each subset;

forming integrals from each of said products of each of said samples and coefficients, each integral corresponding to the range bin of the sample and to the frequency window related to the coefficient used to form that product; and periodically computing, using said integrals, the amount of energy received by said radar system in said frequency windows of said at least one range bin.

4. The method according to claim 3 wherein said step of forming said products includes the step of adding for a predetermined period each of said products to a stored value corresponding to the range bin of the sample and the frequency window related to the coefficient used to form that product.

5. The radar signal processor in claim 1 further including means for determining an enhanced value of the amount of energy received in each of said r range bins and each of said d frequency windows by examining successive computations of said amount of energy.

6. The method of claim 3, further including the step of determining an enhanced value for the amount of energy received in each range bin/frequency window combination from successive computations of the amount of energy received in said range bin/frequency window combination.

7. A method of determining, from samples of energy received by a radar system, the amount of energy in more than one frequency window of at least one range bin, each said frequency window corresponding to two subsets of coefficients which relate to the bandwidth and shape of said frequency window, said method comprising the steps of:

multiplying each of said samples by a corresponding coefficient from each subset;

forming integrals of each of said products of each of said samples and coefficients by adding, for a predetermined period, each of said products to a stored value corresponding to the range bin of the sample and frequency window related to the coefficient used to form said product;

outputting said stored values in an interleaved order according to the periods of said integrals; and periodically computing from said integrals the amount of energy received by said radar system in said frequency windows of said at least one range bin.

8. A method of determining, from samples of energy received by a radar system, the amount of energy in more than one frequency window of at least one range bin, each said frequency window corresponding to two subsets of coefficients which relate to the bandwidth and shape of said frequency window, said method comprising the steps of:

multiplying each of said samples by a corresponding coefficient from each subset;

forming integrals from each of said products of each of said samples and coefficients, each of said integrals corresponding to the range bin of the sample and to the frequency window related to the coefficient used to form that product;

periodically computing from said integrals the amount of energy received by said radar system in said frequency windows of said at least one range bin; and determining an enhanced value for the amount of energy received in each range bin/frequency window combination as a sum of a previously determined enhanced value and a predetermined smoothing constant times a difference between an average power for said range bin/frequency window computation and said previously determined enhanced value.

9. A radar signal processor for determining the amount of energy received in d frequency windows (d being greater than 1) of a radar system producing samples of received energy from r range bins, said radar signal processor comprising:

a memory storing d sets of coefficients, each set of coefficients corresponding to a different one of said frequency windows and each of said sets including two subsets of coefficients, the coefficients in each of said subsets representing a weighting function which is orthogonal to the weighting function represented by the other of said subsets;

means connected to said memory and to said radar system for multiplying each of said samples by a coefficient of each of said subsets thereby to form 2d products sequences for each sample;

an accumulator connected to said multiplying means for storing 2dr summed values, each of said values corresponding to a different combination of range bin, frequency window, and coefficient subset, said accumulator including means for adding each of said products sequences to a summed value corresponding to the range bin of the sample and to the coefficient subset used to form that product sequence;

means connected to said accumulator for periodically computing the amount of energy received in each of said r range bins and each of said d frequency windows from selected values from said accumulator; and means for determining, for each range bin/frequency window combination, an enhanced value equal to the sum of a previous determination of said enhanced value plus a predetermined smoothing constant times the difference between an average power for said range bin/frequency window computation and said previous determination of said enhanced value.

10. A radar signal processor for determining the amount of energy received in d frequency windows (d being greater than 1) of a radar system producing samples of received energy from r range bins, said radar signal processor comprising:

a memory storing d sets of coefficients, each set of coefficients corresponding to a different one of said frequency windows in each of said sets including two subsets of coefficients, d coefficients in each of said subsets representing a weighting function which is orthogonal to the weighting function represented by other of said subsets;

means connected to said memory and to said radar system for multiplying each of said samples by a coefficient of each of said subsets thereby to form 2d products sequences for each sample said multiplying means including means for outputting said product sequences in an interleaved order according to a preset period;

an accumulator connected to said multiplying means for storing 2dr summed values during said predetermined period, each of said values corresponding to a different combination of range bin, frequency window, and coefficient subset, said accumulator adding each of said product sequences to a summed value corresponding the range bin of the sample to the coefficient subset used to form that product sequence; and means connected to said accumulator for periodically computing the amount of energy received in each of said r range bins in each of said d frequency windows from selected values from said accumulator.

* * * * *